US011827268B2

(12) United States Patent
Kim et al.

(10) Patent No.: US 11,827,268 B2
(45) Date of Patent: Nov. 28, 2023

(54) VEHICLE STEERING COLUMN

(71) Applicant: HL MANDO CORPORATION, Pyeongtaek (KR)

(72) Inventors: Jong Han Kim, Anyang (KR); Sang Hyun Park, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 47 days.

(21) Appl. No.: 17/435,793

(22) PCT Filed: Mar. 13, 2020

(86) PCT No.: PCT/KR2020/003512
§ 371 (c)(1),
(2) Date: Sep. 2, 2021

(87) PCT Pub. No.: WO2020/185030
PCT Pub. Date: Sep. 17, 2020

(65) Prior Publication Data
US 2022/0048556 A1    Feb. 17, 2022

(30) Foreign Application Priority Data

Mar. 14, 2019   (KR) ........................ 10-2019-0029555
Mar. 10, 2020   (KR) ........................ 10-2020-0029779

(51) Int. Cl.
  *B62D 1/19*       (2006.01)
  *B62D 1/181*      (2006.01)
  *B62D 1/185*      (2006.01)

(52) U.S. Cl.
  CPC ............. *B62D 1/195* (2013.01); *B62D 1/181* (2013.01); *B62D 1/185* (2013.01)

(58) Field of Classification Search
  CPC ........ B62D 1/195; B62D 1/181; B62D 1/185; B62D 1/192
  See application file for complete search history.

(56) References Cited

U.S. PATENT DOCUMENTS 4,805,478 A    2/1989  Beauch
5,737,971 A    4/1998  Kremer
(Continued)

FOREIGN PATENT DOCUMENTS

CN      114667251 A  *  6/2022  ............. B62D 1/181
DE      102015216326 A1   6/2016
(Continued)

OTHER PUBLICATIONS

Office Action issued in Germany Patent Application No. 112020001223.9 dated Feb. 3, 2023.

*Primary Examiner* — Drew J Brown
(74) *Attorney, Agent, or Firm* — Harvest IP Law, LLP (57) ABSTRACT

Embodiments of the present invention may provide a vehicle steering column comprising: a hollow-shaped upper tube in which a steering shaft is fitted; a middle tube coupled to the outer circumferential side of the upper tube so as to allow the axial telescopic movement of the upper tube; a lower tube coupled to the outer circumferential side of the middle tube so as to allow the axial telescopic movement of the middle tube; a mounting bracket coupled to the outer circumferential side of the lower tube; and a telescopic link member which is coupled at one end thereof to a telescopic motor and a telescopic speed reducer, provided at the lower tube, and is coupled at the other end thereof to the upper tube.

20 Claims, 11 Drawing Sheets

(56) References Cited

U.S. PATENT DOCUMENTS

| | | |
|---|---|---|
| 2013/0233117 A1 | 9/2013 | Read |
| 2018/0251147 A1* | 9/2018 | Heitz ..................... B62D 1/181 |
| 2019/0210632 A1 | 7/2019 | Derocher |
| 2019/0225255 A1* | 7/2019 | Ishimura ................ B62D 1/185 |

FOREIGN PATENT DOCUMENTS

| | | | |
|---|---|---|---|
| DE | 102017221004 A1 | 5/2019 | |
| FR | 3103446 A3 * | 5/2021 | ............. B62D 1/181 |
| JP | 2010083392 A | 4/2010 | |
| JP | 2011121440 A | 6/2011 | |
| KR | 100814759 B1 | 3/2008 | |
| KR | 101953140 B1 | 2/2019 | |
| WO | WO-2019175502 A1 * | 9/2019 | ....... B60R 25/02156 |

* cited by examiner

VEHICLE STEERING COLUMN

CROSS REFERENCE TO RELATED APPLICATIONS

This application is a National Stage of International Application No. PCT/KR2020/003512 filed Mar. 13, 2020, claiming priority based on Korean Patent Application No. 10-2019-0029555 filed Mar. 14, 2019 and Korean Patent Application No. 10-2020-0029779 filed Mar. 10, 2020.

TECHNICAL FIELD

The present embodiments relate to a vehicle steering column, and more specifically, to a vehicle steering column which may increase the telescoping distance when telescoping and absorb shocks in the event of a vehicle collision, thereby enhancing the driver's convenience and stability.

BACKGROUND ART

A vehicle steering column typically consists of a lower tube and an upper tube that are inserted and coupled to each other, a distance bracket and a plate bracket for applying a tightening force to the lower tube and the upper tube, a mounting bracket for fixing to the vehicle body, an adjusting bolt for locking and unlocking of tilting and telescoping, and a tilt motor and a telescope motor for tilting and telescoping.

However, the so-structured conventional vehicle steering column has a limited telescoping distance by its structural limitations.

Further, the collapse structure, which absorbs collision loads in case of a vehicle collision, may not properly function, failing to absorb collision energy.

In particular, recent ongoing research and development activities for autonomous vehicles have led to demand for a structure for drawing in or out the steering column to allow for more space at the driver's seat in auto driving mode. In response, there is an increasing need for research and development for increasing the driver's convenience and stability by allowing the steering wheel to be stored inside the vehicle and to stick out toward the driver's seat.

DETAILED DESCRIPTION OF THE INVENTION

Technical Problem

The present embodiments have been conceived in the above-described background, aiming to provide a vehicle steering column which may increase the driver's convenience by increasing the telescoping distance when telescoping and reduce operation noise and operation loads and absorb collision energy of the vehicle.

The objects of the present embodiments are not limited to the foregoing and other objects will be apparent to one of ordinary skill in the art from the following detailed description.

Technical Solution

According to the present embodiments, there may be provided a vehicle steering column, comprising a hollow upper tube having a steering shaft placed thereinside, a middle tube coupled to an outer circumference of the upper tube to allow the upper tube to axially telescope, a lower tube coupled to an outer circumference of the middle tube to allow the middle tube to axially telescope, a mounting bracket coupled to an outer circumference of the lower tube, and a telescoping link member having a first end coupled with a telescope motor and a telescope decelerator provided in the lower tube and a second end coupled to the upper tube.

Advantageous Effects

As described above, according to the present embodiments, it is possible to increase the driver's convenience by increasing the telescoping distance when the vehicle steering column performs telescoping and reduce operation noise and operation loads and absorb collision energy of the vehicle.

BRIEF DESCRIPTION OF DRAWINGS

FIG. 9, FIGS. 6 and 7, is an exploded perspective view illustrating a portion of a vehicle steering column according to the present embodiments;

MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Figure 1:
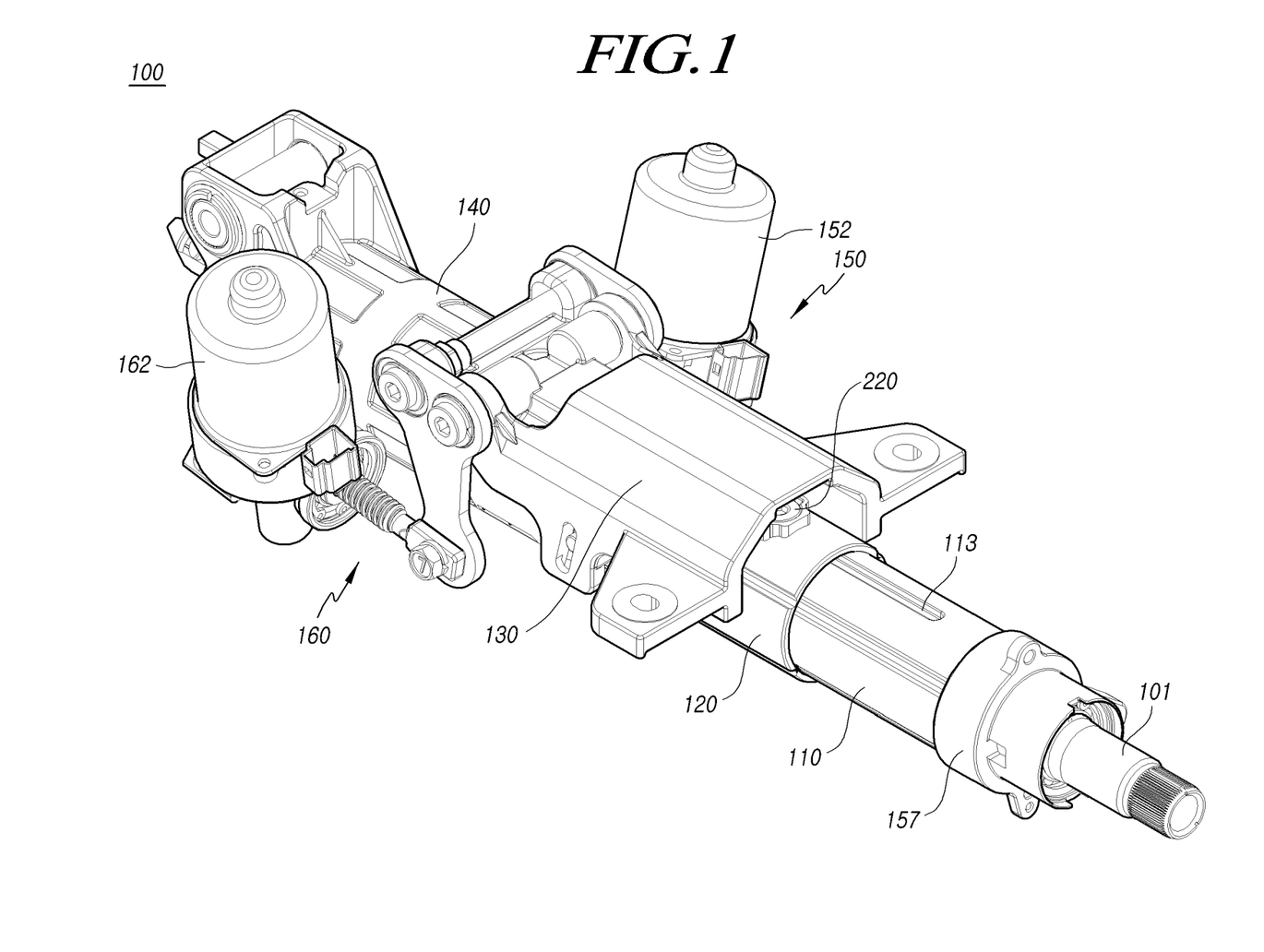
FIGS. 1 and 2 are perspective views illustrating a vehicle steering column according to the present embodiments.
Figure 2:
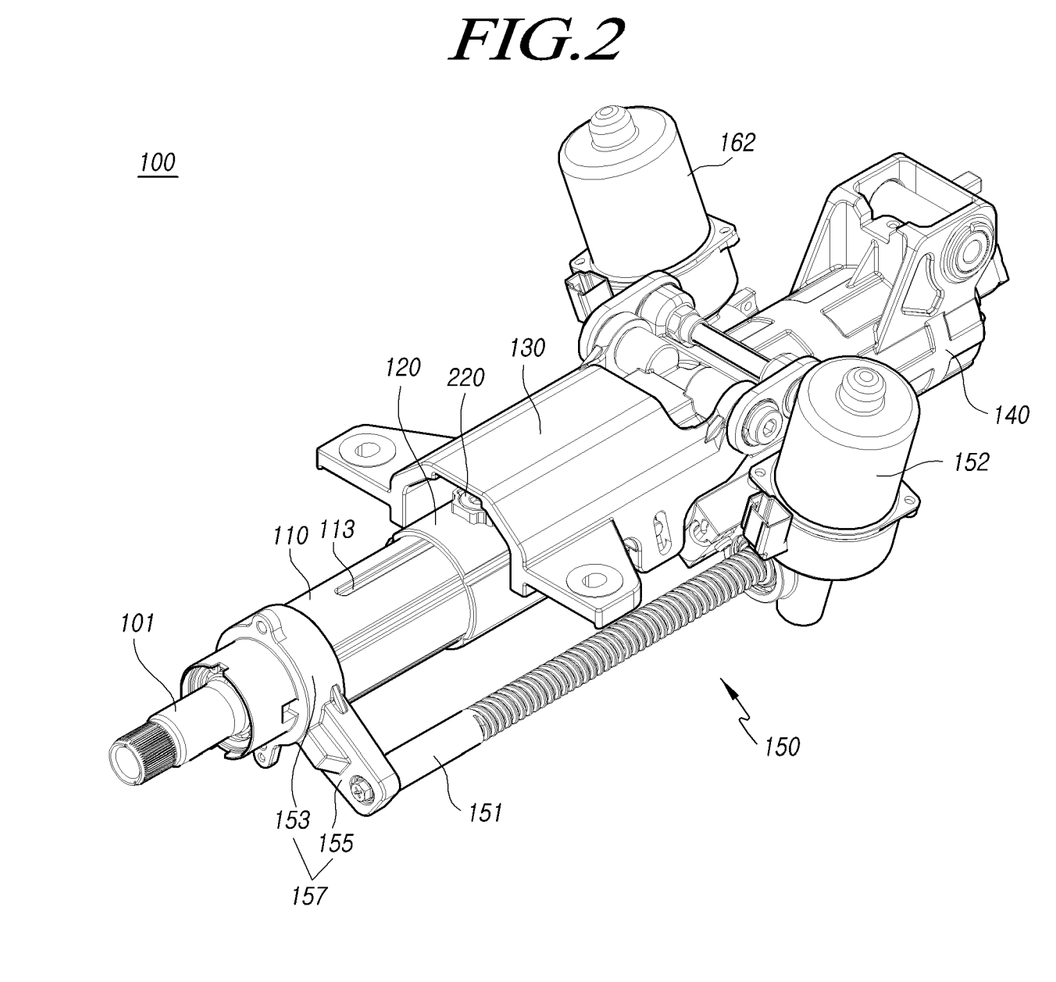
Figure 3:
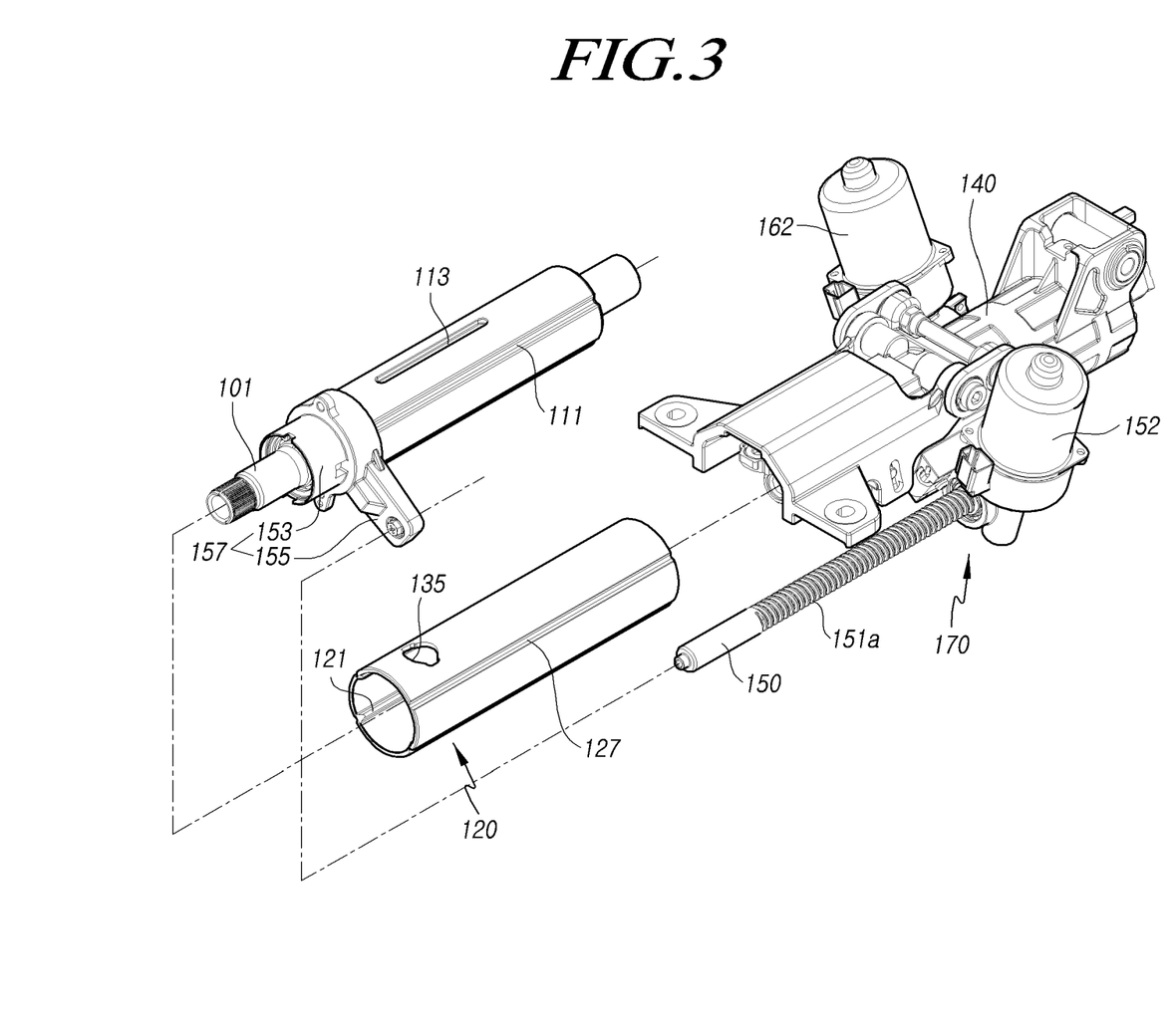
FIGS. 3 and 4 are exploded perspective views illustrating a portion of a vehicle steering column according to the present embodiments.
Figure 4:
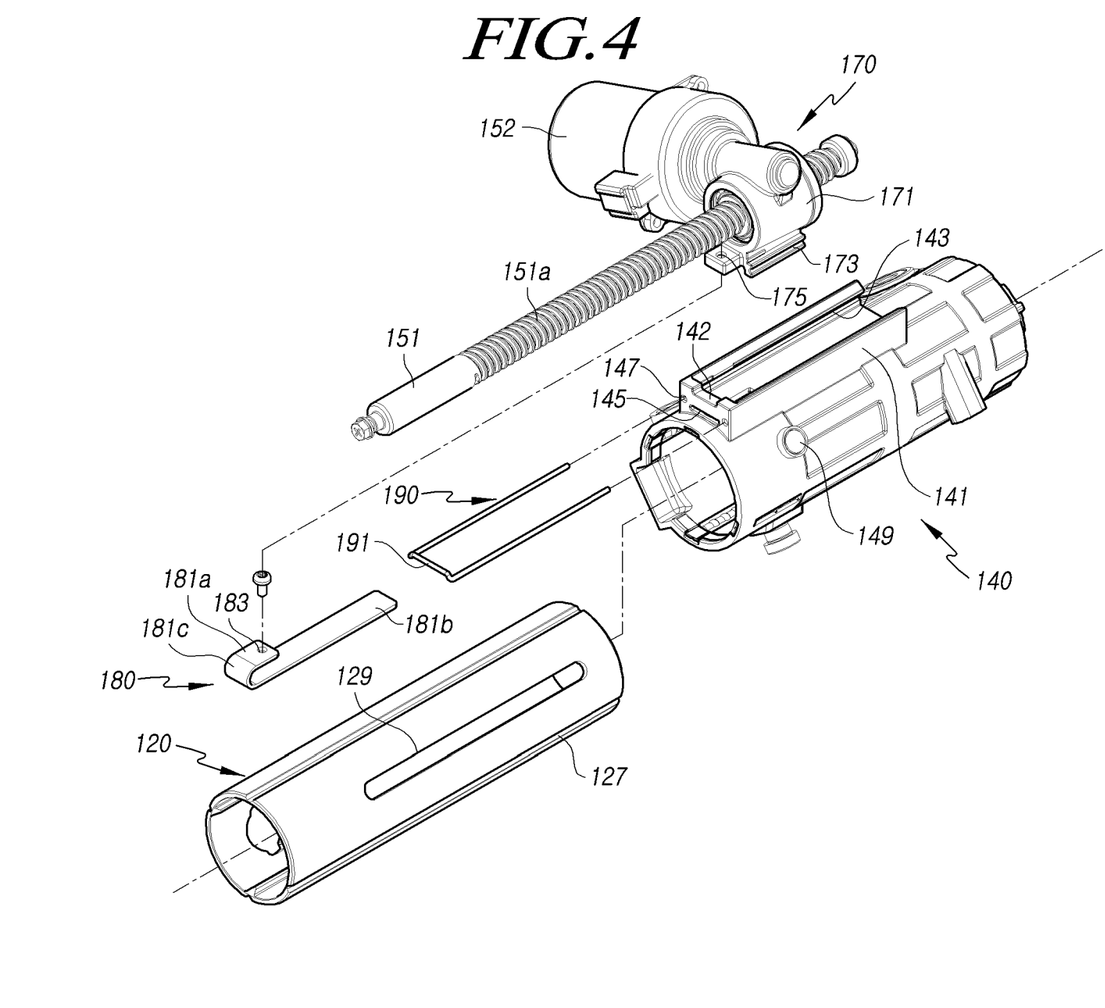
Figure 5:
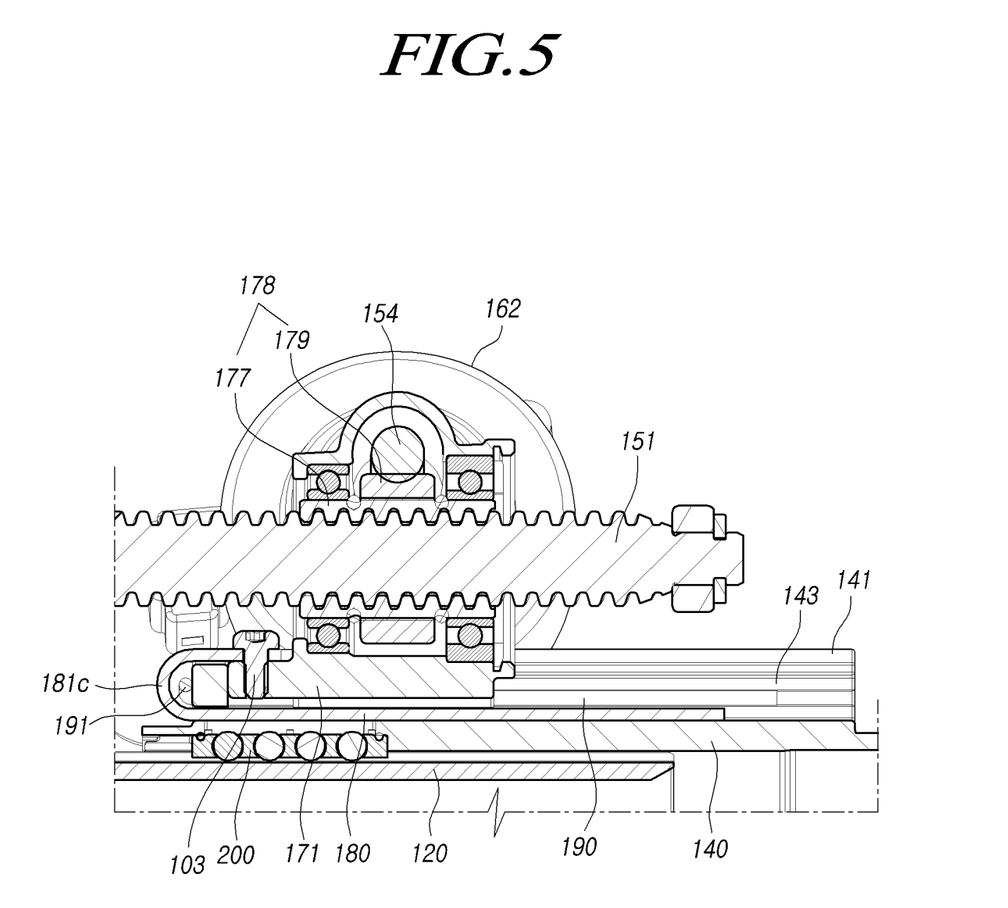
FIG. 5 is a cross-sectional view illustrating a portion of a vehicle steering column according to the present embodiments.
Figure 6:
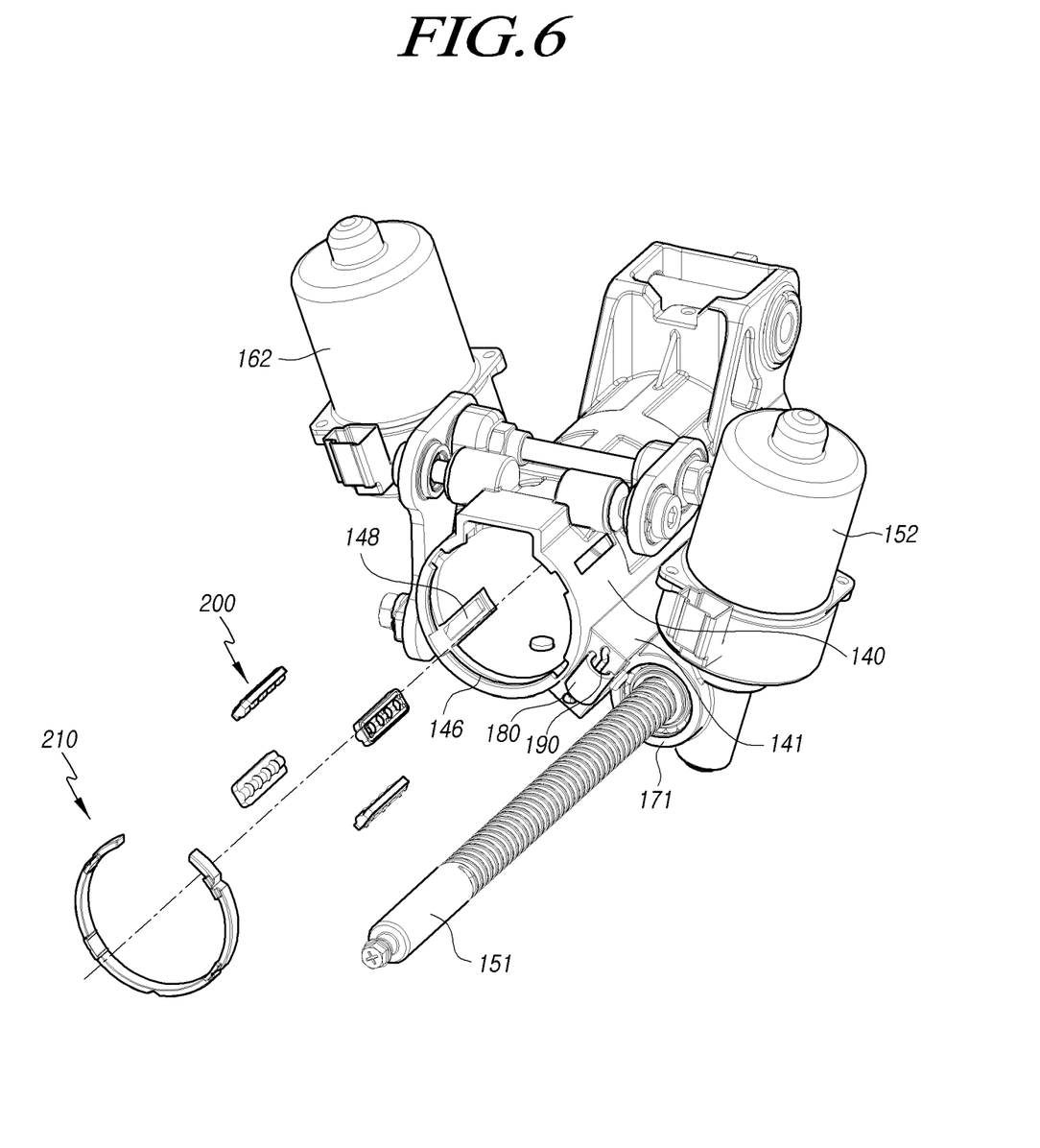
FIGS. 6 and 7 are exploded perspective views illustrating a portion of a vehicle steering column according to the present embodiments.
Figure 7:
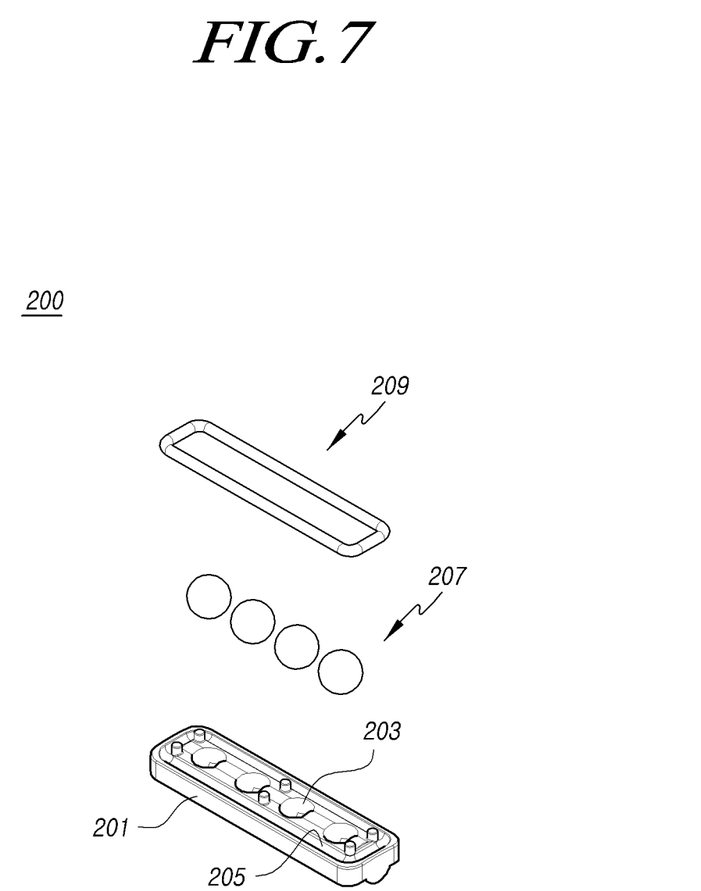
Figure 8:
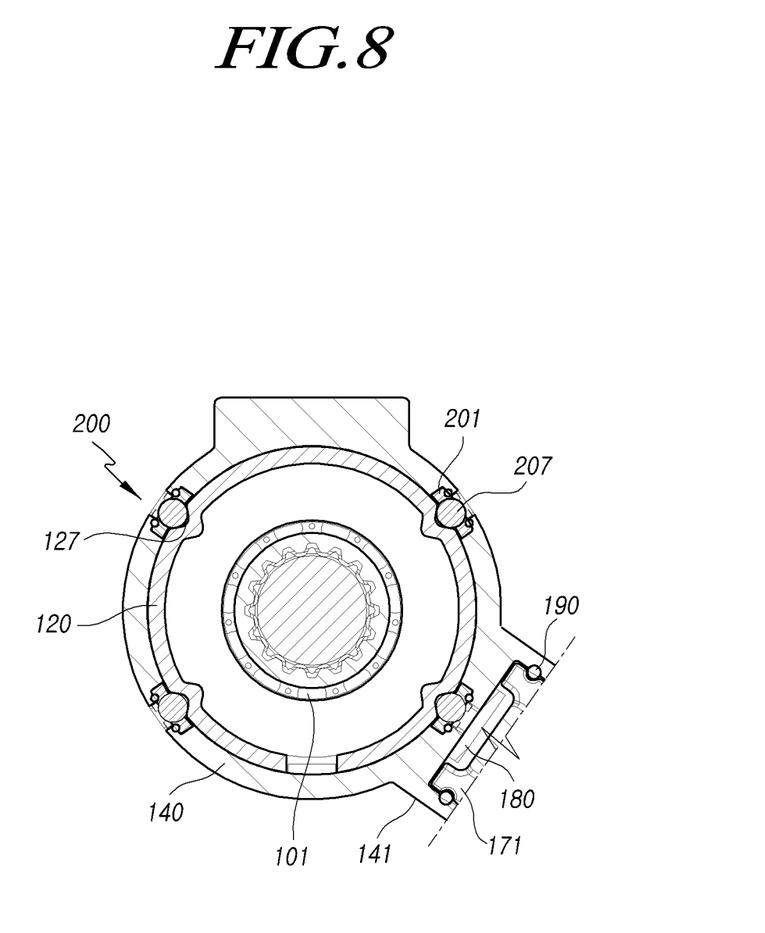
FIG. 8 is a cross-sectional view illustrating a portion of a vehicle steering column according to the present embodiments.
Figure 9:
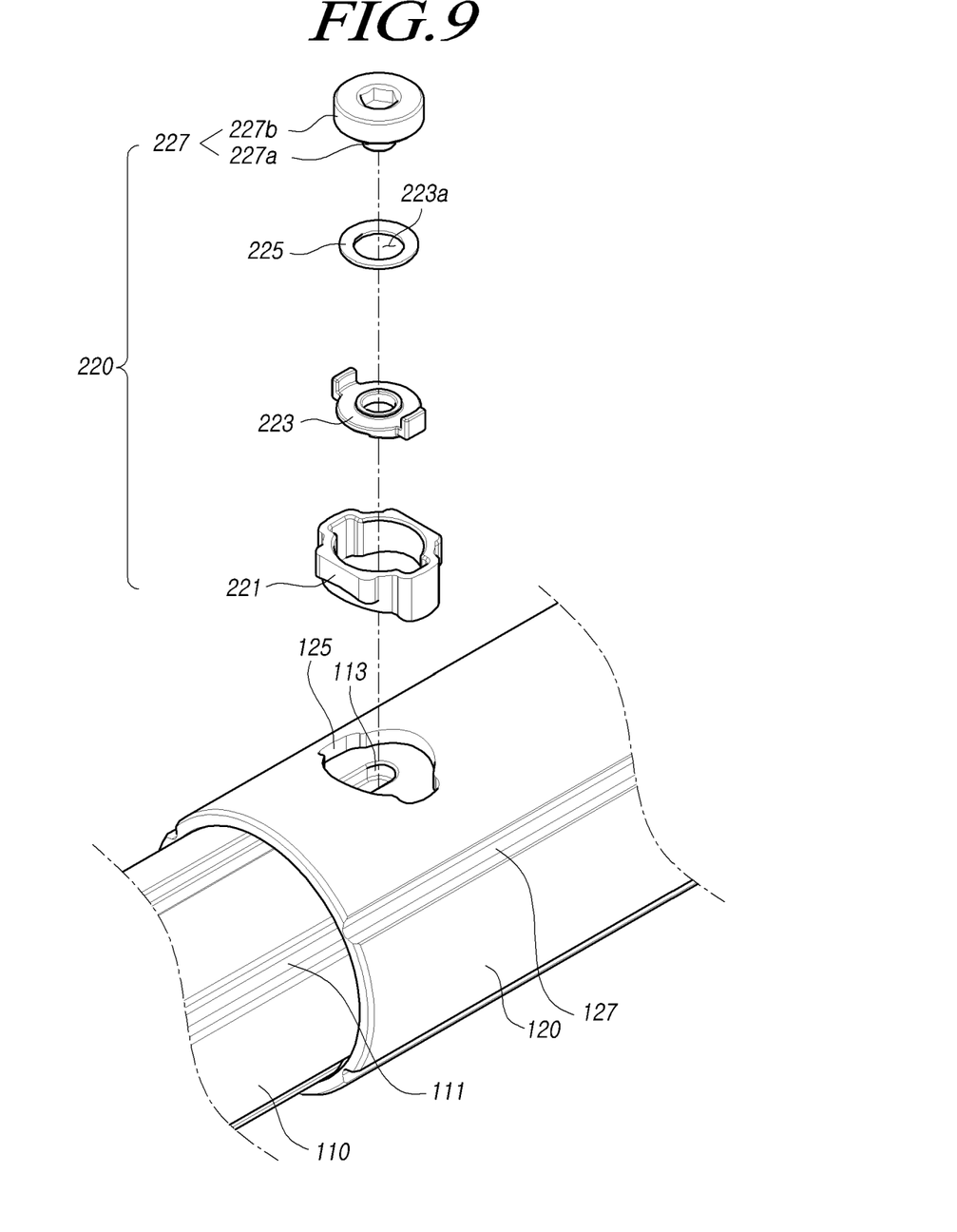
Figure 10:
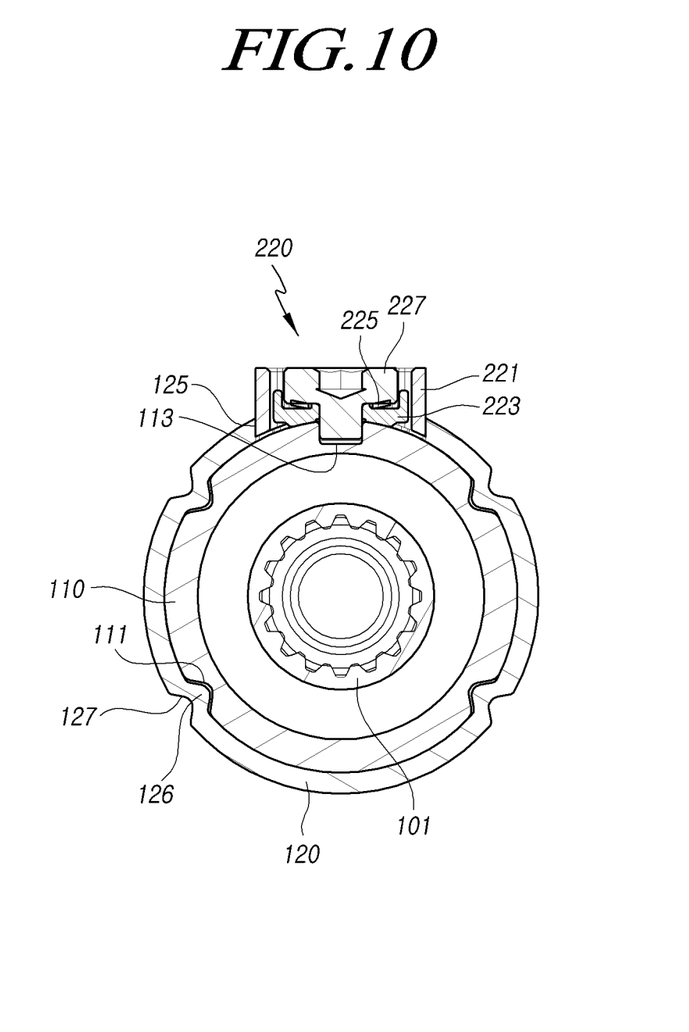
FIG. 10 is a cross-sectional view illustrating a portion of a vehicle steering column according to the present embodiments.
Figure 11:
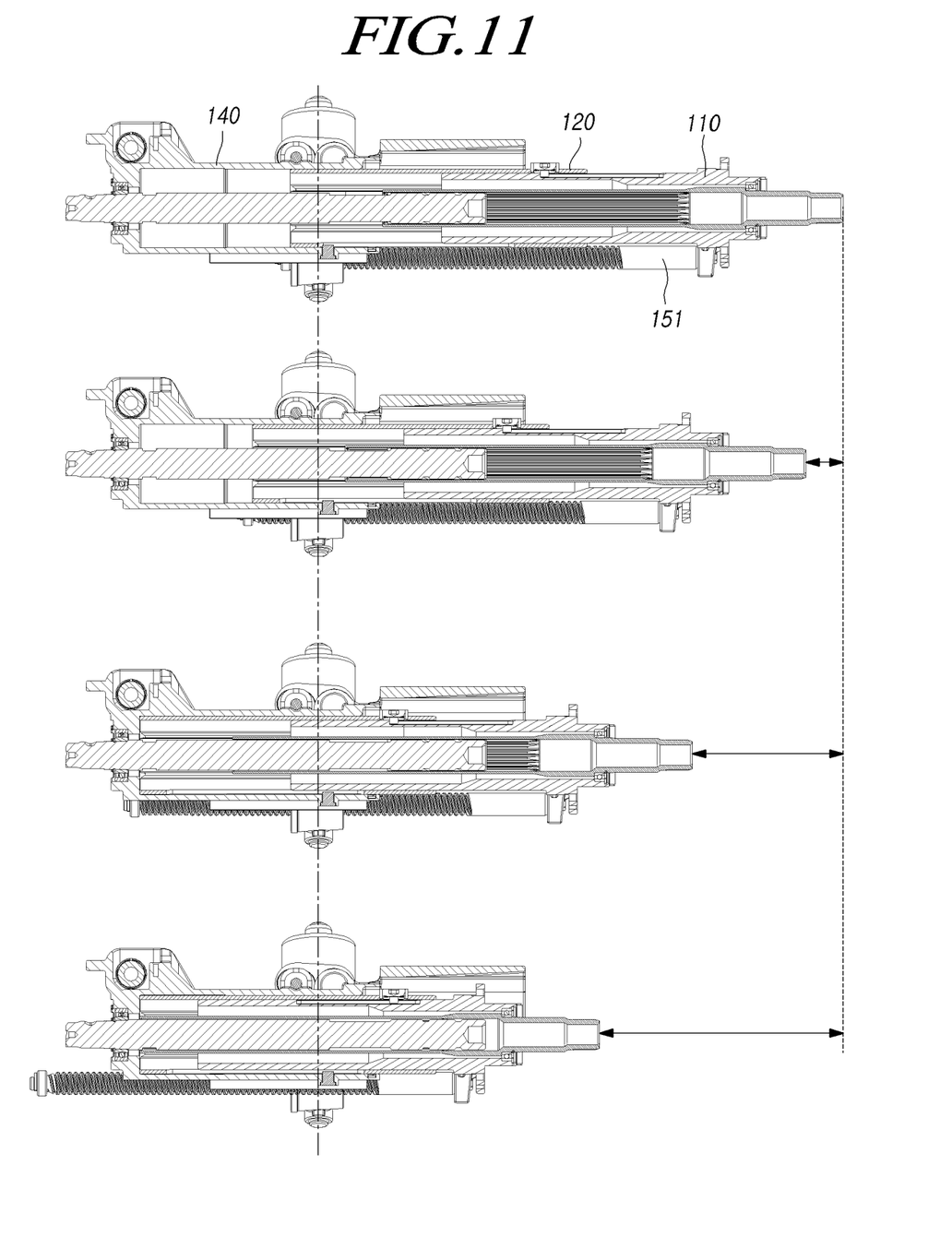
FIG. 11 is a cross-sectional view illustrating a telescoping state of a vehicle steering column according to the present embodiments.

FIGS. 1 and 2 are perspective views illustrating a vehicle steering column according to the present embodiments. FIGS. 3 and 4 are exploded perspective views illustrating a portion of a vehicle steering column according to the present embodiments. FIG. 5 is a cross-sectional view illustrating a portion of a vehicle steering column according to the present embodiments. FIGS. 6 and 7 are exploded perspective views illustrating a portion of a vehicle steering column according to the present embodiments. FIG. 8 is a cross-sectional view illustrating a portion of a vehicle steering column according to the present embodiments. FIG. 9, FIGS. 6 and 7, is an exploded perspective view illustrating a portion of a vehicle steering column according to the present embodiments. FIG. 10 is a cross-sectional view illustrating a portion of a vehicle steering column according to the present embodiments. FIG. 11 is a cross-sectional view illustrating a telescoping state of a vehicle steering column according to the present embodiments.

As illustrated in the drawings, according to the present embodiments, a vehicle steering column 100 includes a hollow upper tube 110 having a steering shaft 101 placed thereinside, a middle tube 120 coupled to an outer circumference of the upper tube 110 to allow the upper tube 110 to axially telescope, a lower tube 140 coupled to an outer circumference of the middle tube 120 to allow the middle tube 120 to axially telescope, a mounting bracket 130 coupled to an outer circumference of the lower tube 140, and a telescoping link member 150 having a first end coupled with a telescope motor 152 and a telescope decelerator 170 provided in the lower tube 140 and a second end coupled to the upper tube 110.

Further, according to the present embodiments, the vehicle steering column 100 may further include a tilt link member 160 having a first end connected with a tilt motor 162 coupled to the lower tube 140 and a second end rotatably coupled with the mounting bracket 130 and the lower tube 140.

In the present embodiments, in the vehicle steering column 100, the upper tube 110, the middle tube 120, and the lower tube 140, in which the steering shaft 101 is placed, are axially inserted into each other to perform axial telescopic movement. There may be provided two or more middle tubes 120 between the upper tube 110 and the lower tube 140.

The mounting bracket 130 is coupled to the outer circumference of the lower tube 140 so that the steering column may be coupled to the vehicle body.

A first end of the telescope link member 150 is coupled to the telescope motor 152 and the telescope decelerator 170 provided in the lower tube 140, and a second end of the telescope link member 150 is coupled to the upper tube 110 so that the upper tube 110 and the middle tube 120 may be axially telescoped into the inside of the lower tube 140.

The telescope decelerator 170 converts the driving force of the motor 152 by a reduction gear ratio and transfers it to the sliding member 151. The telescope decelerator 170 includes a rotating member 178, which is coupled with the shaft 154 of the telescope motor 152 and rotates, and a sliding member 151, which is axially drawn in or out when the rotating member 178 rotates.

The rotating member 178 is formed in a hollow shape. The rotating member 178 has an outer circumferential gear part 179 at an outer circumference thereof and an inner circumferential gear part 177 at an inner circumference thereof. The outer circumferential gear part 179 is coupled with the shaft 154 of the telescope motor 152. The inner circumferential gear part 177 is engaged with the sliding member 151. The rotating member 178 rotates in conjunction with the telescope motor 152 to axially move the sliding member 151.

In the rotating member 178, the outer circumferential gear part 179 and the inner circumferential gear part 177 may be integrally formed with each other, or the outer circumferential gear part 179 may be separately manufactured and coupled with the inner circumferential gear part 177. According to the present embodiments, the drawings illustrate an example in which the outer circumferential gear part 179 is separately manufactured and is coupled with the inner circumferential gear part 177.

The sliding member 151 is formed in a bar shape to be inserted into the rotating member 178. The screw part 151a provided at the outer circumference is engaged with the inner circumferential gear part 177 of the rotating member 178 so that when the rotating member 178 rotates, the sliding member 151 is axially drawn in or out, inside the rotating member 178 to move the upper tube 110 and the middle tube 120.

The telescope link member 150 further includes a connecting member 157 to which the sliding member 151 is rotatably coupled and which couples an end of the sliding member 151 with the upper tube 110. The connecting member 157 has a ring-shaped main body 153 coupled with the first end of the upper tube 110 and a fixed end 155 which radially protrudes from the main body 153 and to which the end of the sliding member 151 is rotatably coupled.

Thus, if the above-described telescope motor 152 operates, the sliding member 151, along with the upper tube 110, axially moves, performing telescopic motion to axially move the middle tube 120 together therewith.

The lower tube 140 has a collision load absorbing part that absorbs the collision load while the sliding housing 171 of the telescope decelerator 170 axially moves in the event of a vehicle collision.

The collision load absorbing part includes a lower housing 141 and a bending plate 180. The sliding housing 171, which axially slides along with the upper tube 110 and the middle tube 120 upon a vehicle collision, is supported and coupled to an inside of the lower housing 141. The bending plate 180 is plastically deformed to absorb collision loads when the sliding housing 171 slides.

The lower housing 141 is shaped substantially as a rectangular box into which the sliding housing 171 is inserted and is formed on the outer circumferential surface of the lower tube 140. The lower housing 141 has an axial, closed first end having a communication hole 145 and an axial, open second end. The sliding housing 171 is supported and coupled to two opposite inner sides of the lower housing 141.

A first end 181b of the bending plate 180 is placed on the open second end of the lower housing 141, and a second end 181a of the bending plate 180 is bent through the communication hole 145 of the lower housing 141 toward the second end and is fixed to the sliding housing 171 supported on a mounting recess 142. In the event of a vehicle collision, the sliding housing 171, along with the second end 181a of the bending plate 180, is axially slid, plastically deforming the bending plate 180.

The second end 181a of the bending plate 180 and a first side of the sliding housing 171 have fixing holes 183 and 175 and are fixed by a fixing member 103 which is fitted into the fixing holes 183 and 175. However, without being limited thereto, the second end 181a of the bending plate 180 may be fixed to the sliding housing 171 by fusion or welding.

A guide member 190 for guiding the sliding of the sliding housing 171 may be provided between the two opposite inner side surfaces of the lower housing 141 and two opposite side surfaces of the sliding housing 171.

Insertion holes 147 through which the guide member 190 passes are formed, on two opposite sides, in the first end of the lower housing 141. Guide grooves 143 and 173 corresponding to the insertion holes 147 are axially formed in the two opposite inner side surfaces of the lower housing 141 and the two opposite side surfaces of the sliding housing 171.

Accordingly, when axially moving in the event of a vehicle collision, the sliding housing 171 moves along the guide member 190 without deflecting or escaping off to a side.

Further, as the bent portion 191 of the guide member 190 is situated between the bent portion 181c of the bending plate 180 and the first end of the lower housing 141, the bending plate 180 is bent while being supported on the guide member 190 when the sliding housing 171 slides.

Accordingly, when the sliding housing 171 slides, the bending plate 180 is plastically deformed and is smoothly moved.

Meanwhile, a first load supporting member 200, which supports the axial retraction or extraction of the middle tube 120, is provided between the inner circumferential surface of the lower tube 140 and the outer circumferential surface of the middle tube 120, adjusting the operation load upon telescoping.

Here, there may be provided two or more first load supporting members 200 which are circumferentially spaced apart from each other between the inner circumferential surface of the lower tube 140 and the outer circumferential surface of the middle tube 120.

The first load supporting member 200 includes a housing 201, which is fixed to the inner circumferential surface of the lower tube 140, and a rotation supporting member 207, which is rotatably coupled to the housing 201 and is rotated while being supported on the middle tube 120.

The first load supporting member 200 may further include an open ring-shaped housing supporting member 210 that is coupled to the inner circumferential surface of the lower tube 140 while axially supporting the housing 201.

The housing 201 formed in a substantially rectangular shape has a seating recess 203, in which the rotation supporting member 207 is mounted, an inner circumferential groove 205, into which an elastic ring 209 elastically supported by the mounting part 148 of the lower tube 140 is fitted, and protrusions for preventing the elastic ring 209 from escaping off.

A first guide rail 127 on which the rotation supporting member 207 is seated to be rotationally supported is axially provided on the outer circumstantial surface of the middle tube 120.

Accordingly, upon telescoping, the middle tube 120 is drawn in or out of the lower tube 140 while the rotation supporting member 207 is rotatively supported on the first guide rail 127.

Further, the middle tube 120 is provided with an axially cut middle slot 129, and the lower tube 140 is provided with a middle guide part 149 which is inserted into the middle slot 129 to limit the axial traveling distance of the middle tube 120.

The middle guide part 149 is formed in a bolt shape, is coupled to a supporting hole 149a provided in the lower tube 140, and is supported by the middle slot 129.

A second guide rail 111 is axially formed on an outer circumstantial surface of the upper tube 110, and a middle supporting part 126, which is inserted into and supported by the second guide rail 111 is provided on the inner circumstantial surface of the middle tube 120.

Therefore, the upper tube 110 is axially drawn in or out without deflection to one side during telescoping.

Further, a second load supporting member 220, which supports the axial retraction or extraction of the upper tube 110, is provided between the inner circumferential surface of the middle tube 120 and the outer circumferential surface of the upper tube 110, adjusting the operation load upon telescoping.

Here, the second load supporting member 220 includes a bushing 223, which is coupled to the middle tube 120 and has a through hole 223a formed thereinside, and a stopper bolt 227, which has a protrusion supporting part 227a fitted into the through hole 223a and supported on the outer circumferential surface of the upper tube 110 and a body part 227b diameter-expanded on the protrusion supporting part 227a and supported on the top of the bushing 223.

The second load supporting member 220 may further include a bushing housing 221 fitted into an outer circumferential hole 125 formed in the middle tube 120 and fitted over the bushing 223 and an elastic member 225 elastically supported and coupled between the body part 227b and the bushing 223.

Further, an upper slot 113 is axially formed in the outer circumferential surface of the upper tube 110, and the protrusion supporting part 227a is inserted into the upper slot 113 to limit the axial traveling distance of the upper tube 110.

Telescoping of the steering column is described with reference to FIG. 11. The steering column at the top of FIG. 11 is illustrated as having a state in which the telescope-out amount is the maximum, and the steering column at the bottom of FIG. 11 is illustrated as having a state in which the telescope-in amount is the maximum.

As the total length of the steering column decreases from the top to the bottom of FIG. 11, a telescope-in motion is performed. In this case, the middle tube is first drawn in with the lower tube fixed and, if the middle tube is completely drawn in, the upper tube starts to be drawn in, increasing the telescoping distance of the steering column.

As described above, according to the present embodiments, it is possible to increase the driver's convenience by increasing the telescoping distance when the vehicle steering column performs telescoping and reduce operation noise and operation loads and absorb collision energy of the vehicle.

Although it is described above that all of the components are combined into one or are operated in combination, embodiments of the disclosure are not limited thereto. One or more of the components may be selectively combined and operated as long as it falls within the scope of the objects of the embodiments.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A vehicle steering column, comprising:
a hollow upper tube having a steering shaft placed thereinside;
a middle tube coupled to an outer circumference of the upper tube to allow the upper tube to axially telescope;
a lower tube coupled to an outer circumference of the middle tube to allow the middle tube to axially telescope;
a mounting bracket coupled to an outer circumference of the lower tube; and
a telescoping link member having a first end coupled with a telescope motor and a telescope decelerator provided in the lower tube and a second end coupled to the upper tube,
wherein the upper tube is configured to axially telescope in telescope-in and telescope-out directions with respect to the middle tube according to a driving force of the telescope motor,
wherein the lower tube has a collision load absorbing part that absorbs a collision load while a sliding housing of the telescope decelerator axially moves in an event of a vehicle collision,
wherein the collision load absorbing part includes a lower housing formed on an outer circumferential surface of the lower tube,
wherein the sliding housing of the telescope decelerator is supported on and slideably coupled to two opposite inner sides of the lower housing and configured to axially slide along the two opposite inner sides of the lower housing in the telescope-in direction in the event of the vehicle collision.

2. The vehicle steering column of claim 1, wherein the telescope decelerator includes:
a rotating member having an outer circumferential gear part at an outer circumference thereof and an inner circumferential gear part at an inner circumference and rotating in conjunction with the telescope motor, the outer circumferential gear part coupled with a shaft of the telescope motor; and
a sliding member having a screw part provided at an outer circumference thereof and coupled to the inner circumferential gear part of the rotating member to be axially drawn in or out when the rotating member rotates.

3. The vehicle steering column of claim 2, wherein the telescoping link member further includes a connecting member coupling an end of the sliding member with the upper tube, the sliding member rotatably coupled to the connecting member.

4. The vehicle steering column of claim 1,
wherein the lower housing has an axial first end provided with a communication hole and an axial, open second end; and
wherein the collision load absorbing part further includes a bending plate having a first end disposed on the open second end of the lower housing and a second end bent through the communication hole and fixed to the sliding housing.

5. The vehicle steering column of claim 4, wherein the second end of the bending plate and a first side of the sliding housing have fixing holes and are fixed by a fixing member fitted into the fixing holes.

6. The vehicle steering column of claim 5, wherein a guide member guiding a slide of the sliding housing is provided between two opposite inner side surfaces of the lower housing and two opposite side surfaces of the sliding housing.

7. The vehicle steering column of claim 6, wherein insertion holes through which the guide member passes are formed, on two opposite sides apart from the communication hole, in the first end of the lower housing, and wherein guide grooves corresponding to the insertion holes are formed on the two opposite inner side surfaces of the lower housing and the two opposite side surfaces of the sliding housing.

8. The vehicle steering column of claim 7, wherein the guide member is situated between a bent portion of the bending plate and the first end of the lower housing, and wherein the bending plate is supported by the guide member when the sliding housing slides.

9. The vehicle steering column of claim 1, wherein a first load supporting member is provided between an inner circumferential surface of the lower tube and an outer circumferential surface of the middle tube to support axial retraction or extraction of the middle tube.

10. The vehicle steering column of claim 9, wherein two or more first load supporting members are provided between the inner circumferential surface of the lower tube and the outer circumferential surface of the middle tube and are circumferentially spaced apart from each other.

11. The vehicle steering column of claim 10, wherein the first load supporting member includes:
a housing fixed to the inner circumferential surface of the lower tube; and
a rotation supporting member rotatably coupled to the housing and rotated while being supported on the middle tube.

12. A vehicle steering column, comprising:
a hollow upper tube having a steering shaft placed thereinside;
a middle tube coupled to an outer circumference of the upper tube to allow the upper tube to axially telescope;
a lower tube coupled to an outer circumference of the middle tube to allow the middle tube to axially telescope;
a mounting bracket coupled to an outer circumference of the lower tube; and
a telescoping link member having a first end coupled with a telescope motor and a telescope decelerator provided in the lower tube and a second end coupled to the upper tube,
wherein the upper tube is configured to axially telescope with respect to the middle tube according to a driving force of the telescope motor,
wherein two or more first load supporting members are provided between the inner circumferential surface of the lower tube and the outer circumferential surface of the middle tube to support axial retraction or extraction of the middle tube and are circumferentially spaced apart from each other,
wherein the first load supporting member includes a housing fixed to the inner circumferential surface of the lower tube, and a rotation supporting member rotatably coupled to the housing and configured to rotate while being supported on the middle tube, wherein the first load supporting member further includes an open ring-shaped housing supporting member axially supporting the housing and coupled to the inner circumferential surface of the lower tube.

13. The vehicle steering column of claim 12, wherein a first guide rail is axially provided on an outer circumferential surface of the middle tube, the rotation supporting member seated and rotatively supported on the first guide rail.

14. The vehicle steering column of claim 1, wherein the middle tube has an axially cut middle slot, and the lower tube has a middle guide part inserted into the middle slot to limit an axial traveling distance of the middle tube.

15. The vehicle steering column of claim 1, wherein a second guide rail is axially formed on an outer circumferential surface of the upper tube, and a middle supporting part is provided on an inner circumferential surface of the middle tube to be inserted into and supported on the second guide rail.

16. The vehicle steering column of claim 1, wherein a second load supporting member is provided between an inner circumferential surface of the middle tube and an outer circumferential surface of the upper tube to support axial retraction or extraction of the upper tube.

17. The vehicle steering column of claim 16, wherein the second load supporting member includes:
a bushing coupled to the middle tube and provided with a through hole thereinside; and
a stopper bolt having a protrusion supporting part fitted into the through hole and supported on the outer circumferential surface of the upper tube and a body part diameter-expanded from the protrusion supporting part and supported on an upper side of the bushing.

18. The vehicle steering column of claim 17, wherein the second load supporting member includes:
a bushing housing fitted into an outer circumferential hole formed in the middle tube and fitted over the bushing; and
an elastic member elastically supported and coupled between the body part and the bushing.

19. The vehicle steering column of claim 18, wherein an upper slot is axially formed in the outer circumferential surface of the upper tube, and wherein the protrusion supporting part is inserted into the upper slot to limit an axial traveling distance of the upper tube.

20. A vehicle steering column, comprising:
a hollow upper tube having a steering shaft placed thereinside;
a middle tube coupled to an outer circumference of the upper tube to allow the upper tube to axially telescope;
a lower tube coupled to an outer circumference of the middle tube to allow the middle tube to axially telescope;
a mounting bracket coupled to an outer circumference of the lower tube; and
a telescoping link member having a first end coupled with a telescope motor and a telescope decelerator provided in the lower tube and a second end coupled to the upper tube,
wherein the upper tube is configured to axially telescope with respect to the middle tube according to a driving force of the telescope motor,
wherein a first load supporting member is provided between an inner circumferential surface of the lower tube and an outer circumferential surface of the middle tube to support axial retraction or extraction of the middle tube,
wherein the first load supporting member includes:
a housing having a substantially rectangular shape and disposed such that a length direction of the rectangular shape is in an axial direction of the lower tube and a width direction of the rectangular shape is in a circumferential direction of the lower tube,
a plurality of rotation supporting members, rotatably mounted in the housing in a row in the axial direction and configured to rotate while being supported on the middle tube.

* * * * *